H. C. CLAY.
GEARING.
APPLICATION FILED JUNE 20, 1908.

901,070.

Patented Oct. 13, 1908.

Witnesses
Frank A. Fahle
Thomas W. McMeans

Inventor
Harry C. Clay,
By Bradford Hood
Attorneys

UNITED STATES PATENT OFFICE.

HARRY C. CLAY, OF COLUMBUS, INDIANA, ASSIGNOR TO REEVES & COMPANY, OF COLUMBUS, INDIANA, A CORPORATION OF INDIANA.

GEARING.

No. 901,070.   Specification of Letters Patent.   Patented Oct. 13, 1908.

Application filed June 20, 1908. Serial No. 439,528.

*To all whom it may concern:*

Be it known that I, HARRY C. CLAY, a citizen of the United States, residing at Columbus, in the county of Bartholomew and State of Indiana, have invented certain new and useful Improvements in Gearing, of which the following is a specification.

The object of my invention is to provide means for positively reciprocating in both directions a rotary member, the structure being especially designed for use in place of the spring found in my Patent No. 849,530.

The accompanying drawings illustrate my invention.

Figure 1:
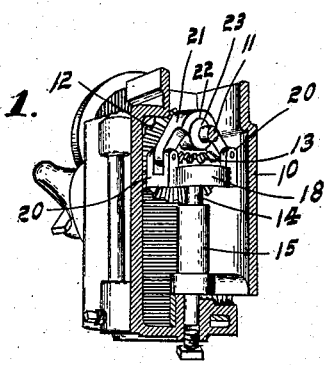
Figure 2:
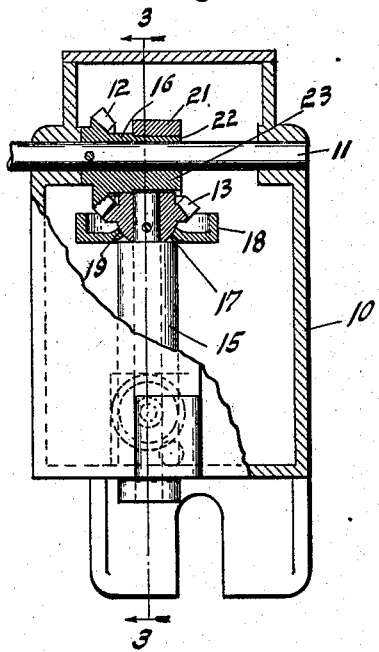
Figure 3:
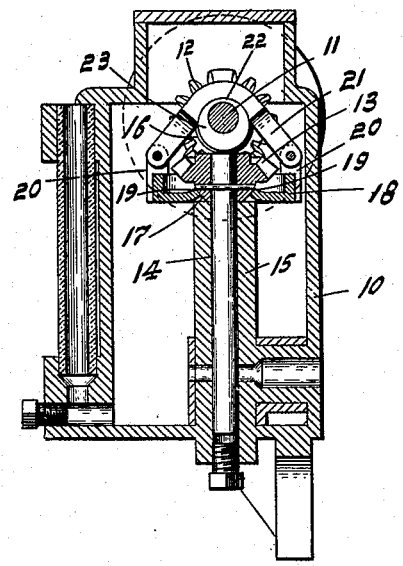

Figure 1 is a perspective sectional view of a pump constructed generally in accordance with the aforesaid patent and embodying the present invention; Fig. 2 a section at right angles to that of Fig. 1; Fig. 3 a section on line 3 3 of Fig. 2.

In the drawings, 10 indicates a reservoir in the upper end of which is journaled a shaft 11 carrying an eccentric bevel gear 12 which meshes with a bevel gear 13 attached to the upper end of the rotary reciprocating pump plunger 14 which is journaled in a cylinder 15 formed in reservoir 10. Secured to shaft 10, conveniently integral with the eccentric gear 12, is an eccentric or cam 16 having an eccentricity equal to the eccentricity of the gear 12 and engaging the upper end of the hub of gear 13. All of these parts are substantially identical with the corresponding parts found in my above mentioned patent and therefore need no further description.

In the aforesaid patent a compression spring surrounding plunger 14 was provided to normally urge the said plunger upward so as to maintain the meshing of gears 12 and 13. That construction is open to some objections, and the spring is therefore dispensed with in the present construction. In place thereof I form the lower end of the hub of gear 13 as a truncated hemisphere 17 and surrounding the same is a ring 18 having a truncated hemispherical pocket 19 adapted to receive the part 17 and to wabble thereon. At diametrically opposite points ring 18 is provided with ears 20 adapted to receive the lower ends of a yoke 21 which straddles shaft 11. Yoke 21 is provided in its under side with a pocket 22 adapted to receive an eccentric or cam 23 which may be conveniently formed integrally with gear 12 and eccentric 16 and this eccentric 23 has the same eccentricity as eccentric 16 but has a diameter slightly less than said eccentric so that it will not come into engagement with the upper end of the hub of gear 13. By this arrangement a rotation of shaft 11 causes a rotation and axial reciprocation of plunger 14, the meshing of the gears 12 and 13 being continuously maintained by the yoke 21 and ring 18.

I claim as my invention:—

1. The combination, of a pair of shafts lying at an angle to each other, intermediate connecting gears between said shafts rotatively connecting the same, and means for reciprocating one of the shafts axially, said means comprising a ring engaging the shaft in one direction, a cam engaging the shaft in the other direction, and a yoke carried by the ring and straddling the cam.

2. The combination, of a pair of shafts lying at an angle to each other, an eccentric gear carried by one of the shafts, a gear carried by the other shaft and meshing with the eccentric gear, a spherical segment carried by said last mentioned shaft, a ring having a spherical pocket adapted to receive the spherical segment, an eccentric carried by the first mentioned shaft and engaging a portion carried by the second shaft to produce axial reciprocation in one direction, and a yoke straddling said eccentric and connected to the ring, for the purpose set forth.

3. The combination, of a pair of shafts lying at an angle to each other, an eccentric gear carried by one of the shafts, a gear carried by the other shaft and meshing with the eccentric gear, a spherical segment carried by said last mentioned shaft, a ring having a spherical pocket adapted to receive the spherical segment, an eccentric carried by the first mentioned shaft and engaging a portion carried by the second shaft to produce axial reciprocation in one direction, a second eccentric carried by said first mentioned shaft but having the same eccentricity as the first eccentric, and a yoke straddling said last mentioned eccentric and connected to the ring, for the purpose set forth.

In witness whereof, I have hereunto set my hand and seal at Columbus, Indiana, this fifth day of June, A. D. one thousand nine hundred and eight.

HARRY C. CLAY. [L. S.]

Witnesses:
PERRY KING,
LA FAYETTE BRUCE.